United States Patent Office 2,757,185
Patented July 31, 1956

2,757,185
SUBSTITUTED DI(ISOCYANATOPHENYL) UREAS

Eric Barthel, Jr., New Castle, Del., assignor to E. I. du Pont de Nemours and Company, Wilmington, Del., a corporation of Delaware No Drawing. Application June 30, 1953,
Serial No. 365,280

4 Claims. (Cl. 260—453)

This invention relates to a new class of chemical products and more particularly to new substituted di(isocyanatophenyl) ureas.

It is known that isocyanates react with water to form substituted ureas, and that when water reacts with a polyisocyanate, polymeric products are ordinarily obtained. U. S. Patent No. 2,597,025 to Orth discloses the formation of resinous, potentially reactive products by the treatment of aromatic diisocyanates with from 0.3 to 0.6 mole of water per mole of diisocyanate in a mutual solvent such as pyridine at 100° C. These products are useful adhesives which set rapidly upon further treatment with water. Orth also discloses that if less than 0.4 mole of water per mole of diisocyanate is used or if the temperature of reaction is below 70° C., polymerization tends to be incomplete and crystalline material separates out in a few hours. The crystalline material so formed, however, although possessing some reactivity, has been found to contain only about 7 to 12% as much isocyanate by weight as was present in the diisocyanate starting material.

It is an object of this invention to provide a new class of diisocyanates which are relatively stable during storage, but which are capable of reacting with compounds containing active hydrogen atoms. It is a further object to provide diisocyanates which themselves contain active hydrogen atoms available for reaction. Further objects will appear from the detailed description of this invention which follows.

The products of this invention are di(3-isocyanatophenyl) ureas in which each phenyl group is substituted in the 4-position with an alkyl or alkoxy radical or with a chlorine atom. They have the formula:

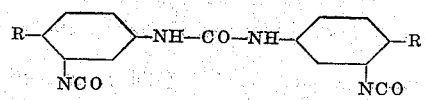

in which R is alkyl, alkoxy or chlorine. A representative and preferred member of this class of compounds is di-(3-isocyanato-4-methylphenyl) urea.

These products may be prepared by the reaction of one molar part of water with two molar parts of a diisocyanate having the formula:

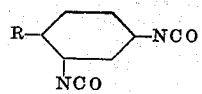

in which R has the significance stated above, at a temperature between 0 and 30° C. Preferably the reaction is carried out by adding the water to a solution of the diisocyanate in an oxygen-containing solvent free from active hydrogen groups and selected from the class consisting of esters, ethers and ketones, while the solution is being agitated. This process is described and claimed in U. S. application Serial No. 365,229 of Ralph L. Pelley, bearing even date herewith. The reaction may also be carried out in the absence of a solvent, as for example by passing nitrogen saturated with moisture through a liquid diisocyanate.

The di(isocyanatophenyl) ureas of this invention may be prepared from 2,4-phenylene diisocyanates in which the 1-position is occupied by a chlorine atom or by an alkyl or alkoxy radical such as methyl, ethyl, propyl, butyl, hexyl, methoxy, ethoxy, butoxy and the like. Compounds containing the lower alkyl or alkoxy radicals, containing up to about 4 carbon atoms are most conveniently obtained and for most purposes are preferred. The alkyl, alkoxy, or chlorine substituent in the 1-position appears to have a shielding effect on the adjacent isocyanate group, so that under the conditions of the present process, it does not react with water. Compounds such as meta- or para-phenylene diisocyanate which do not possess such a shielding substituent will not form monomeric ureas when they are reacted with water, but form polymeric products instead.

When a solvent is employed, it should be one which dissolves the diisocyanate and at least part of the water. It must also be free from groups which are reactive with isocyanates, for example those containing active hydrogen atoms. The solvent should give a neutral reaction in water so as not to act as a polymerization catalyst. Ethers such as diethyl ether and dichloroethyl ether, ketones such as acetone, methylisobutyl ketone, methylamyl ketone, and mesityl oxide, and esters such as isopropyl acetate, and ethyl chloroacetate are satisfactory solvents. It is not necessary that all of the water be soluble in the amount of the solvent used. Mixtures of solvents may be used in which only one component is an oxygen-containing solvent. For example a mixture of 90% n-heptane and 10% dioxane by volume is suitable for this process. Ethyl acetate is the preferred solvent, as it is possible when using this material to add all of the water at once, whereas with solvents such as ether or acetone, the water must be added rather slowly in order to avoid some undesired polymerization.

The amount of water used should be approximately the theoretical amount required to react with two isocyanate groups. The reaction may be carried out at any temperature from 0° to 30° C. At higher temperatures, the quality of the urea is inferior, probably because of contamination with polymeric products.

As the reaction proceeds, the diaryl urea precipitates and may be filtered off or otherwise separated from the solvents or from unreacted diisocyanate. The precipitate is then washed with a little solvent and is dried, preferably in a vacuum oven. When a solvent is used, it may be recycled without further purification and used in the preparation of the next batch. Overall yields of 90 to 95% are thus obtainable. The di(isocyanatophenyl) ureas are obtained as white crystalline material, which is stable in storage and is easily handled. Their vapor pressures are low as compared with the liquid diisocyanates, which are considerably more hazardous.

The products of this invention and the method of obtaining them are illustrated in the following examples.

Example 1

34.8 parts of 2,4-tolylene diisocyanate are dissolved in 90 parts of ethyl acetate in a vessel equipped with an agitator, thermometer, cooling bath, and drying tube on the gas exit line. Agitation is started and the temperature is adjusted to 20–25° C. 1.8 parts of water are added all at once. A slow, steady evolution of gas begins. In about 30 minutes the solution becomes cloudy as a precipitate forms. The solution is agitated for about 18 hours at 20–25° C. The crystalline precipitate is filtered off on a suction filter, washed with about 90 parts of ethyl acetate, and dried in a vacuum oven at 65° C. for 3–4 hours. There are obtained 24.5 parts of white crystalline di(3-isocyanato-4-methylphenyl) urea which represents a 76% conversion of the diisocyanate. Analysis showns 25.85% —NCO compared to a theory of 26.1%. The melting point determined by the copper block capillary method described in "Laboratory Technique in Organic Chemistry" by Avery Morton, McGraw-Hill (1938), page 32 is 176–179° C. when the rate of heating is 5° per minute.

*Example 2*

Into an agitated vessel equipped with a reflux condenser and a thermometer are placed 900 parts of anhydrous ethyl ether and 250 parts of 2,4-tolylene diisocyanate. The agitation is started and 12.9 parts of water are added slowly at a uniform rate over a period of 1.5 hours. Carbon dioxide is evolved and escapes through the reflux condenser. After about 30 minutes a white precipitate begins to form. The temperature of the reaction is held at 20–25° C. by cooling. After all of the water has been added, stirring is continued at the same temperature until the evolution of carbon dioxide ceases, which is about 2 hours. The charge is then poured onto a vacuum filter and filtered. The precipitate is washed with about 200 parts of ether and sucked dry. It is then dried in a vacuum oven at 50° C. The yield of dried di(3-isocyanato-4-methylphenyl) urea is 176 parts (75% of theory). Analysis shows an —NCO content of 26.0% as compared with the theoretical 26.1%.

*Example 3*

Into an agitated vessel are placed 79 parts of acetone and 7.26 parts of 1-methoxy-2,4-phenylene diisocyanate. To this solution is added with stirring 0.344 part of water over a period of about 15 minutes. The temperature is held at 20 to 25° C. with cooling. Carbon dioxide is evolved and bubbles out through a reflux condenser. The solution is stirred overnight. The white precipitate is then filtered off and washed with about 25 parts of acetone and dried in a vacuum oven at 50° C. The dried product weighs 1.8 parts and has a melting point of 241–245° C. Analysis shows an —NCO content of 23.7% (theory is 23.7%) and total nitrogen by Dumas method of 15.15% (theory 15.8%), corresponding to di(3-isocyanato-4-methoxyphenyl) urea.

*Example 4*

9.73 parts of 1-chloro-2,4-phenylene diisocyanate are placed in a dried flask equipped with an agitator and a reflux condenser closed with a drying tube. 37 parts of absolutely dry ether are then added and the mass is agitated at 25–30° C. until the diisocyanate is dissolved. There is added, dropwise, 0.45 part of water. Half is added over a period of 10 minutes and stirring is continued. White crystals start to form after about 25 minutes. The balance of the water is then added over a 10 minute period and stirring is continued for an additional 30 minutes. The crystals are filtered off immediately, washed with a little ether and then dried. The product weighs 4.15 parts. Analysis for —NCO shows 23.7% compared to theory of 23.2% for the compound di(3-isocyanato-4-chlorophenyl) urea.

The substituted di(isocyanatophenyl) ureas of this invention may be employed in the same way as other diisocyanates, but are advantageous in having a lower and more controllable reactivity. Their high melting point and low vapor pressure make them much less hazardous to handle than the conventional diisocyanates and they are also more stable during storage. Although they possess lower reactivity at ordinary temperatures, they become quite reactive when the temperature is raised. When these compounds react with other materials, the reaction products possess increased reactivity toward additional isocyanate, by virtue of the active urea hydrogen atoms present in these compounds. These properties make them particularly useful in the curing of elastomers prepared from the reaction between diisocyanates, water and polyesters or polyethers. Their use in this connection is disclosed and claimed in application Serial No. 435,055 of Frederick B. Hill, Jr., filed June 7, 1954. The substituted di(isocyanatophenyl) ureas are also useful in forming adhesives, plastics and the like.

In view of the ease with which isocyanates normally react with active hydrogen atoms, it is quite surprising that the compounds of this invention which contain both isocyanate groups and active urea hydrogens in the same molecule should exist and be relatively stable at ordinary temperatures.

What is claimed is:

1. A substituted di(3-isocyanatophenyl) urea having the formula:

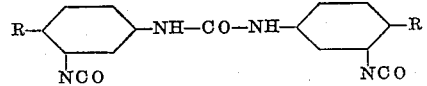

in which R represents a member of the class consisting of lower alkyl and lower alkoxy radicals and chlorine atoms.

2. Di(3-isocyanato-4-methylphenyl) urea.
3. Di(3-isocyanato-4-methoxyphenyl) urea.
4. Di(3-isocyanato-4-chlorophenyl) urea.

References Cited in the file of this patent

FOREIGN PATENTS 482,565    Canada _____ Apr. 15, 1952

OTHER REFERENCES

Bayer: Angew. Chem., A/59, Jahrg. 1947/Nr. 9, p. 264.

Siefken: Ann. 562, 75–136 (1949), as abstracted in 44 C. A., 114 (1950).